United States Patent
Nagasawa (10) Patent No.: US 12,077,214 B2
(45) Date of Patent: Sep. 3, 2024

(54) VEHICLE-BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/469,917

(22) Filed: Sep. 19, 2023

(65) Prior Publication Data
US 2024/0109588 A1   Apr. 4, 2024

(30) Foreign Application Priority Data

Oct. 4, 2022  (JP) .................................. 2022-160597

(51) Int. Cl.
*B62D 21/11*   (2006.01)
*B60G 7/00*    (2006.01)
*B62D 21/02*   (2006.01)

(52) U.S. Cl.
CPC .............. *B62D 21/11* (2013.01); *B60G 7/001* (2013.01); *B62D 21/02* (2013.01); *B60G 2204/15* (2013.01)

(58) Field of Classification Search
CPC ...... B62D 21/11; B62D 21/02; B62D 21/155; B60G 2204/15; B60G 2206/016
See application file for complete search history.

(56) References Cited

U.S. PATENT DOCUMENTS

| | | | | |
|---|---|---|---|---|
| 5,466,005 A * | 11/1995 | Kohlmeier | ............. | B60G 99/00 180/311 |
| 5,882,064 A * | 3/1999 | Emmons | ................ | B62D 23/00 296/193.04 |
| 7,883,113 B2 * | 2/2011 | Yatsuda | ............... | B62D 25/082 180/311 |
| 9,216,768 B1 * | 12/2015 | Dressel | ................ | B62D 21/155 |
| 2005/0012362 A1 * | 1/2005 | Patberg | .................. | B62D 21/02 296/203.01 |

(Continued)

FOREIGN PATENT DOCUMENTS

| | | | | |
|---|---|---|---|---|
| JP | 2012201290 A | * | 10/2012 | ............. B60K 1/04 |
| JP | 2018199471 A | * | 12/2018 | ........... B62D 21/152 |
| JP | 2020-083144 A | | 6/2020 | |

*Primary Examiner* — Frank B Vanaman
(74) *Attorney, Agent, or Firm* — Smith, Gambrell & Russell, LLP (57) ABSTRACT

A vehicle-body front structure includes front side frames in a pair, sub-frames in a pair, lower arms, and action members. Each sub-frames is provided with first and second coupling portions, an action-member fixation portion, and a recess. The coupling portions rotatably fix a corresponding one of the lower arms. The action-member fixation portion is provided between the coupling portions and rotatably fixes a corresponding one of the action members on the vehicle upper side of each sub-frame. The recess is fitted to the corresponding action member. The fixation portion of each action member is fitted to the recess of the corresponding one of the sub-frames. Each action member is fixed at the action-member fixation portion and the second coupling portion to the corresponding sub-frame and is fixed at the second coupling portion to the corresponding sub-frame by being fastened together with the corresponding lower arm.

2 Claims, 5 Drawing Sheets

(56) References Cited

U.S. PATENT DOCUMENTS

| | | | | |
|---|---|---|---|---|
| 2006/0113784 A1* | 6/2006 | Kishima | ............... | B62D 21/155 |
| | | | | 296/203.02 |
| 2011/0316295 A1* | 12/2011 | Yamada | ................. | B62D 21/11 |
| | | | | 293/132 |
| 2012/0242113 A1* | 9/2012 | Yasuhara | ................ | B62D 21/11 |
| | | | | 296/193.07 |
| 2016/0236718 A1* | 8/2016 | Tatsuwaki | ............... | B60R 19/34 |
| 2017/0057547 A1* | 3/2017 | Taguchi | ................. | B62D 21/11 |
| 2018/0339732 A1* | 11/2018 | Takii | ...................... | B62D 21/02 |
| 2020/0047696 A1* | 2/2020 | Atsumi | ................. | B62D 25/084 |
| 2020/0101914 A1* | 4/2020 | Sakai | ................... | B62D 21/155 |
| 2020/0353985 A1* | 11/2020 | Zeitouni | .............. | B62D 21/152 |
| 2022/0153352 A1* | 5/2022 | Mukaigawa | ......... | B62D 21/152 |

* cited by examiner

VEHICLE-BODY FRONT STRUCTURE

CROSS-REFERENCE TO RELATED APPLICATIONS

The present application claims priority from Japanese Patent Application No. 2022-160597 filed on Oct. 4, 2022, the entire contents of which are hereby incorporated by reference.

BACKGROUND

The disclosure relates to a vehicle-body front structure.

In general, in a frontal collision of a vehicle, suppressing a deformation of a cabin, which is a boarding space for an occupant, may be performed as a measure to reduce damage to the occupant, and there are various measures for the suppression.

As one of these measures, a structure that absorbs collision energy by a structure body on the front side of a cabin is used recently.

When the vehicle is a hybrid vehicle, an electric vehicle, or the like, a battery pack as a power source of the vehicle may be mounted on a floor surface at a lower portion of the cabin.

The battery pack stores electric power for driving the vehicle. When a deformation or a disconnection is caused in the battery pack by a frontal collision or the like of the vehicle, a sudden abnormal reaction may occur.

Hybrid vehicles, electric vehicles, and the like thus may employ a structure that suppresses a deformation of a cabin to reduce damage to a battery pack.

Accordingly, there is disclosed a technology that, when an impact of a frontal collision is applied to a battery-mounted vehicle such as a hybrid vehicle or an electric vehicle, absorbs energy of the collision and protects a driving motor at a front portion of the vehicle by, for example, controlling deformations of front side members due to the impact (refer to, for example, Japanese Unexamined Patent Application Publication (JP-A) No. 2020-083144).

SUMMARY

An aspect of the disclosure provides a vehicle-body front structure. The vehicle-body front structure includes front side frames in a pair, sub-frames in a pair, lower arms, and action members. The front side frames are provided at a front portion of a vehicle and extend in a vehicle front-rear direction of the vehicle. The pair of sub-frames are provided on the vehicle lower side of the front side frames and extend in the vehicle front-rear direction. The lower arms constitute a suspension bridging between front wheels of the vehicle. The lower arms are coupled to the sub-frames respectively. The action members are each provided with a fitting portion at a vehicle-rear-side end. The fixation portion that is fitted to a corresponding one of the sub-frames. The action members each extend from the fixation portion toward the inside of a vehicle front portion of the vehicle. Each of the sub-frames is provided with a first coupling portion, a second coupling portion, an action-member fixation portion, and a recess. The first coupling portion and the second coupling portion rotatably fix a corresponding one of the lower arms. The action-member fixation portion is provided between the first coupling portion and the second coupling portion and rotatably fixes a corresponding one of the action members on the vehicle upper side of each of the sub-frames. The recess is fitted to the corresponding one of the action members. The fixation portion of each of the action members is fitted to the recess of the corresponding one of the sub-frames. Each of the action members is fixed at the action-member fixation portion and the second coupling portion to the corresponding one of the sub-frames and is fixed at the second coupling portion to the corresponding one of the sub-frames by being fastened together with the corresponding one of the lower arms.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In a frontal collision of a vehicle, multiple collision forms may be considered. The collision forms include, for example, a full-wrap collision in which the entirety of the front of a vehicle collides with a collision object, an offset collision in which one side of the front of a vehicle collides with a collision object, and a small-overwrap collision in which an offset ratio is approximately 25%.

Therefore, for in each of the collision forms, a structure that suppresses deformations of a cabin and a battery pack by absorbing collision energy by a structure body on the front side of the cabin or the battery pack may be used.

In the technology described in JP-A No. 2020-083144, there is proposed a structure in which, due to a fragile portion included in a cross member, front side members at the sides of a vehicle are bent inward in the width direction of the vehicle to thereby absorb collision energy generated in multiple collision forms.

In the technology described in JP-A No. 2020-083144, however, an impact absorption structure for protecting a cabin or a battery pack on the rear side of the cross member is not considered. Therefore, the cabin or the battery pack may be deformed when the collision energy is transmitted to, of the front side members at both sides of the vehicle, portions on the rear side of the fragile portion.

It is desirable to provide a vehicle-body front structure capable of suppressing deformations of a cabin and a battery pack in multiple frontal collision forms.

Embodiment

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle V to which a vehicle-body front structure S according to the embodiment is applied will be described with reference to FIG. 1 to FIG. 5. The arrow FR illustrated, as appropriate, in the drawings indicates the front side (front) of the vehicle V illustrated in FIG. 1, the arrow UP indicates the upper side in front view, and the arrow LH indicates the left side in front view. In the following description, when up-down, front-rear, and left-right directions are used for the description, the directions indicate the up-down direction in front view, the front-rear direction in front view, and the left-right direction in front view unless otherwise specified.

Figure 1:
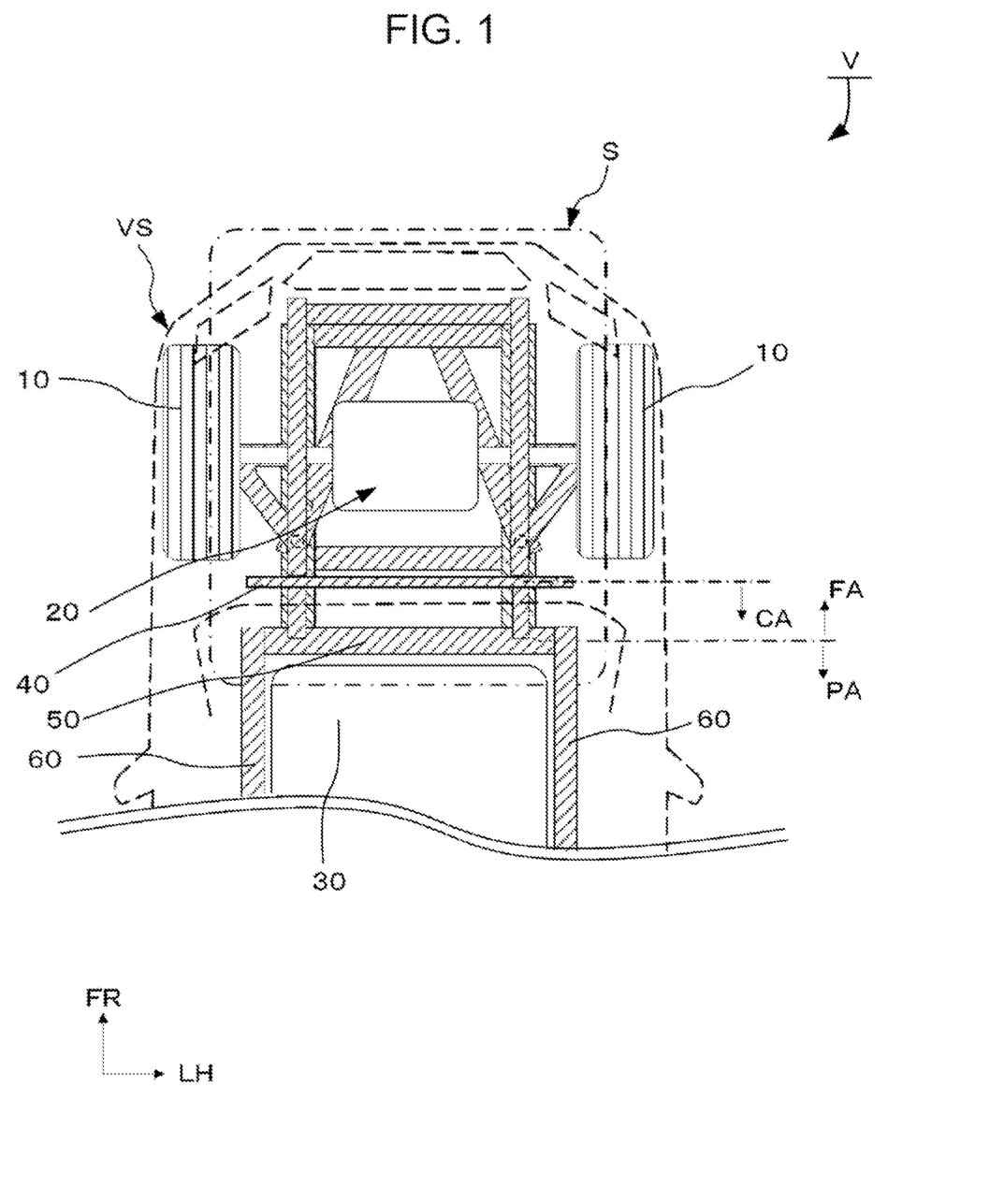
FIG. 1 is a configuration diagram in which a vehicle according to an embodiment of the present disclosure is viewed from above.
Figure 2:
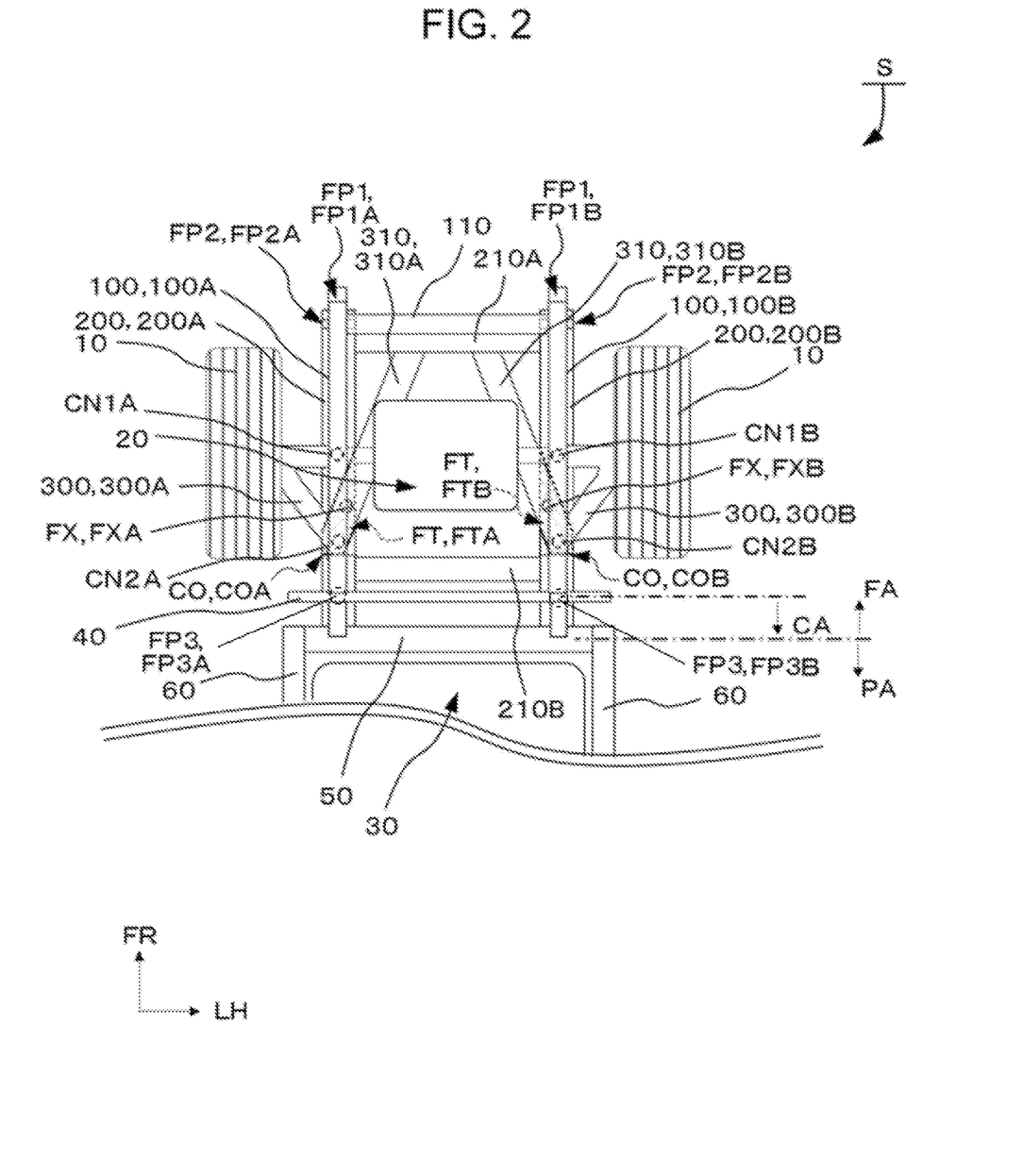
FIG. 2 is a configuration diagram in which a vehicle-body front structure illustrated in FIG. 1 is viewed from above.
Figure 3:
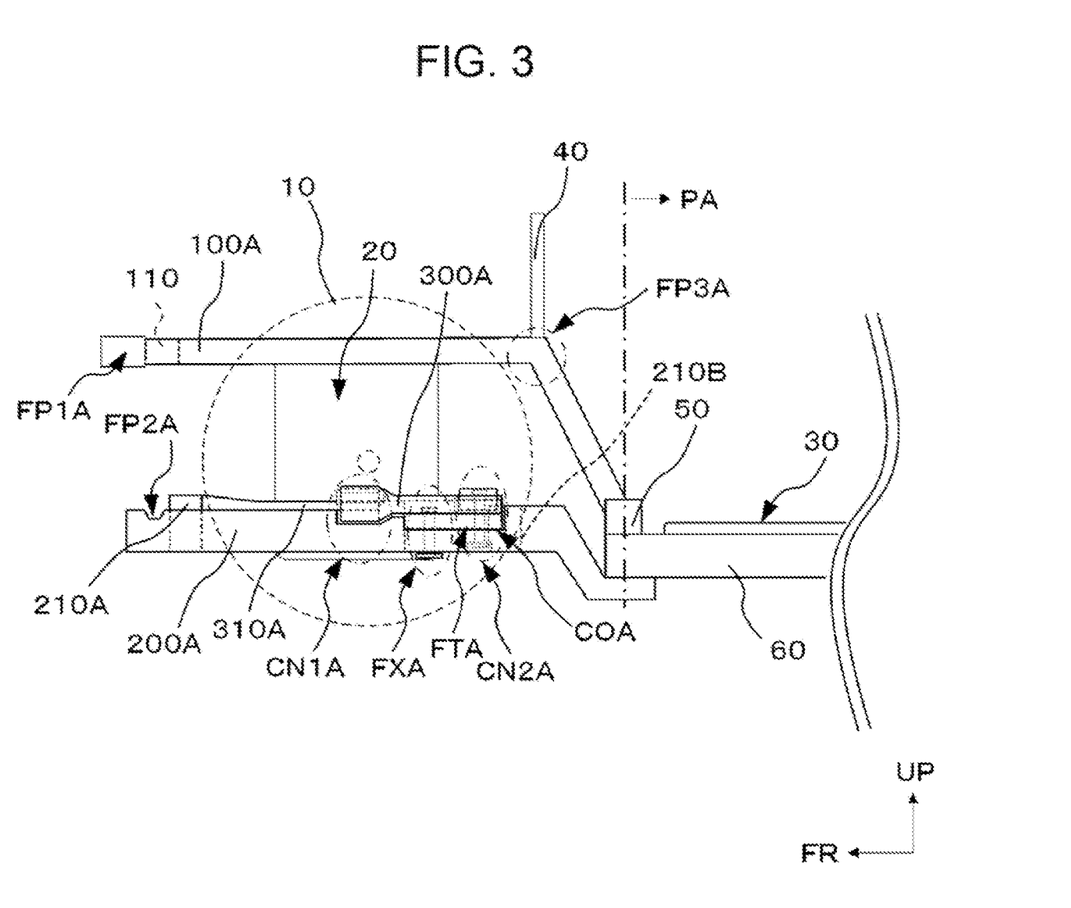
FIG. 3 is a side view in which the vehicle-body front structure illustrated in FIG. 1 is viewed from the right side.

With reference to FIG. 1 to FIG. 3, a configuration of the vehicle-body front structure S, which is included in the vehicle V, according to an embodiment will be described.

Configuration of Vehicle V

The vehicle V is, for example, an electric vehicle using a power unit 20 as a driving source. The vehicle V may be, for example, a hybrid electric vehicle including driving sources that are an engine and the power unit 20.

As illustrated in FIG. 1, the vehicle V includes, in the inside of a vehicle body VS, front wheels 10, the power unit 20, a battery pack 30, a toe board 40, a torque box 50, side sills 60, and the vehicle-body front structure S (the hatched portions surrounded by the dash-dotted line in FIG.

The power unit 20 is a driving device that is constituted by a motor (not illustrated) that drives the front wheels 10, a transmission, a clutch, a drive axle, and the like. The power unit 20 is installed in a space that is surrounded by front side frames 100 and a cross member 110, which will be described later. The power unit is fixed in a state of being placed on the upper surface side of the front side frames 100.

The battery pack 30 has, for example, a flat box shape. Inside the battery pack 30, a large number of battery cells are coupled in series to be capable of outputting a high voltage that is to be supplied to the power unit 20 and electric power for travel of the vehicle V is stored. The battery pack 30 is installed in a space that is surrounded by strong frames of the torque box 50, the side sills 60, and the like, which will be described later. The battery pack 30 is used in, for example, a vehicle such as an electric vehicle (EV), a hybrid electric vehicle (HEV), or the like.

The toe board 40 is a partition wall that extends in the up-down direction on the vehicle front side of a cabin CA and that partitions a front-wheel driving device of the vehicle V and the cabin CA from each other. The toe board 40 is joined to a rear upper side of each of the front side frames 100 by, for example, welding.

The torque box 50 is a member that is interposed between the front side frames 100 and the side sills 60, which will be described later, and that couples the front side frames 100 and the side sills 60 to each other. The torque box 50 is a framework extending at the bottom surface of the vehicle V in the vehicle width direction. The torque box 50 is joined by, for example, welding to one end portions of the front side frames 100 that are disposed on both sides of the torque box 50 in the vehicle width direction. The torque box 50 is made of a metal or the like having high rigidity and has a substantially rectangular closed cross-sectional shape. The torque box 50 is located on the front side of the battery pack 30. End portions of the torque box 50 are joined by, for example welding to one end portions of the side sills 60 on both sides of the torque box 50 in the vehicle width direction.

One end portions of the front side frames 100 disposed on both sides of the torque box 50 (described later) in the vehicle width direction are joined by, for example, welding to the vehicle front side and the upper surface side of the torque box 50.

The vehicle rear side of the torque box 50 is a protection region PA. The protection region PA is a region in which deformations of the cabin CA located on the vehicle upper side of the protection region PA and the battery pack 30 located on the vehicle lower side thereof are reduced.

The side sills 60 are provided at a side bottom surface on both sides in the vehicle width direction of the vehicle. Each of the side sills 60 is a framework that extends in the vehicle front-rear direction. Each of the side sills 60 is made of a metal or the like having high rigidity and has a substantially rectangular closed cross-sectional shape. The side sills 60 form bottom sides on both sides of the protection region PA.

The vehicle-body front structure S is formed in the inside of a vehicle front chamber FA on the vehicle front side of the torque box 50. The configuration of the vehicle-body front structure S will be described later.

Configuration of Vehicle-Body Front Structure S

The vehicle-body front structure S according to the embodiment will be described with reference to FIG. 2 and FIG. 3.

The vehicle-body front structure S is left-right symmetric in the vehicle width direction.

As illustrated in FIG. 2, the vehicle-body front structure S includes the front side frames 100 (front side frames 100A and 100B), the cross member 110, sub-frames 200 (sub-frames 200A and 200B), sub-cross members 210 (sub-cross members 210A and 210B), lower arms 300 (lower arms 300A and 300B), and action members 310 (action members 310A and 310B).

Front Side Frames 100

The front side frames 100 are disposed as a pair on both sides of a vehicle front portion in the vehicle width direction. The front side frames 100 are located on the vehicle upper side of the power unit 20 that drives the front wheels 10 of the vehicle V. The front side frames 100 extend in the vehicle front-rear direction. As illustrated in FIG. 3, each of the front side frames 100 has a slope that is bent at a bent portion FP3 (bent portions FP3A or FP3B), which is a portion joined to the toe board 40 toward the vehicle-rear lower side. Each of the front side frames 100 is joined at an end portion on the vehicle rear side to the torque box 50 by, for example, welding. Each of the front side frames 100 constitutes the framework of the vehicle V. Each of the front side frames 100 is made of a metal or the like having high rigidity and has a substantially rectangular closed cross-sectional shape.

A vehicle-front end portion of each of the front side frames 100 is provided with a fragile portion FP1 (fragile portion FP1A or FP1B). The fragile portion FP1 is made of, for example, a member that is weaker than the front side frames 100 and has a substantially rectangular closed cross-sectional shape.

The front side frames 100 are each disposed at a location where, even when a small-overwrap collision from the vehicle front side occurs, the collision is received by a vehicle-front-side end of each of the front side frames 100. In one example, the center of the vehicle-front-side end of each of the front side frames 100 is, for example, disposed at a location on the inner side of an end of the vehicle V in the vehicle width direction and where a distance from the end is within 25% of the width of the vehicle V.

Cross Member 110

As illustrated in FIG. 2 the cross member 110 extends in the vehicle width direction on the vehicle front side of the front side frames 100, and both end portions of the cross member 110 are joined by, for example, welding to the front side frames 100 on both sides in the vehicle width direction. The cross member 110 is made of a metal or the like and has a substantially rectangular closed cross-sectional shape.

Sub-Frames 200

As illustrated in FIG. 3, the sub-frames 200 extend in the vehicle front-rear direction on the vehicle lower side of the front side frames 100. The sub-frames 200 are disposed as a pair on both sides in the vehicle width direction at the bottom surface of the power unit 20. Each of the sub-frames 200 is made of a metal or the like having high rigidity and has a substantially rectangular closed cross-sectional shape. The bottom surface of each of the sub-frames 200 is located on the vehicle upper side of the bottom surface of the torque box 50, and the sub-frames 200 are joined by, for example, welding to the torque box 50. The vehicle-front-side upper surface of each of the sub-frames 200 is provided with a recessed fragile portion FP2 (fragile portion FP2A or FP2B) on the vehicle front side of the sub-cross members 210 (described later).

Each of the sub-frames 200 includes a coupling portion CN1 (coupling portion CN1A or CN1B) as a first coupling portion that rotatably fixes a corresponding one of the lower arms 300 (described later) and a coupling portion CN2 (coupling portion CN2A or CN2B) as a second coupling portion on the vehicle rear side of the coupling portion CN1. Each of the sub-frames 200 includes, on the upper surface side thereof, a fixation portion FX (fixation portion FXA or FXB) between the coupling portion CN1 and the coupling portion CN2. The fixation portion FX serves as an action-member fixation portion that fixes a corresponding one of the action members 310 (described later).

Each of the sub-frames 200 includes the coupling portion CN1 (coupling portion CN1A or CN1B) as the first coupling portion that is provided on the vehicle front side of the sub-frames 200 and that fixes the a corresponding one of the lower arms 300 (described later) to be rotatable about an axis extending in the vehicle front-rear direction, and the coupling portion CN2 (coupling portion CN2A or CN2B) as the second coupling portion on the vehicle rear side of the coupling portion CN1. Each of the sub-frames 200 includes, on the upper surface side thereof, a fixation portion FX (fixation portion FXA or FXB) between the coupling portion CN1 and the coupling portion CN2. The fixation portion FX serves as an action-member fixation portion that fixes a corresponding one of the action members 310 (described later).

The vehicle-rear-side upper surface of each of the sub-frames 200 is provided with a recess CO (recess COA or COB) to be fitted to a corresponding one of the action members 310. The recess CO is provided with a step that is lowered from the vehicle upper side toward the vehicle lower side of the sub-frame 200 on the vehicle front side of the fixation portion FX. The recess CO has a recessed shape that returns to have a height identical to the height of a vehicle-front end of the sub-frame 200 from the surface of the step toward the vehicle upper side on the vehicle rear side of the coupling portion CN2.

Each of the sub-frames 200 is disposed at a location where, even when a small-overwrap collision from the vehicle front side occurs, the collision is received by the vehicle-front-side end of the sub-frame 200. In one example, the center of the vehicle-front-side end of each of the sub-frames 200 is, for example, disposed at a location on the inner side of an end of the vehicle V in the vehicle width direction and where a distance from the end is within 25% of the width of the vehicle V.

Sub-Cross Members 210A and 210B

The sub-cross members 210A and 210B extend between the sub-frames 200 on both sides in the vehicle width direction. The sub-cross member 210A is provided on the vehicle front side of the sub-frames 200, and the sub-cross member 210B is provided on the vehicle rear side of the sub-frames 200. Each of the sub-cross members 210A and 210B is made of a metal or the like and has a substantially rectangular closed cross-sectional shape. End portions of each of the sub-cross members 210A and 210B are joined by, for example, welding to the sub-frames 200 on both sides in the vehicle width direction.

In the vehicle-body front structure S, the sub-frames 200A and 200B, the sub-cross members 210A and 210B, the torque box 50, and the side sills 60 are joined together to form a rigid framework that has a parallel cross shape.

Lower Arms 300

As illustrated in FIG. 2, the lower arms 300 form a suspension that bridges between the front wheels 10. Each of the lower arms 300 is coupled at the coupling portion CN1 and the coupling portion CN2, which are disposed in the vehicle front-rear direction, to a corresponding one of the sub-frames 200. The lower arms 300 are each made of a strong metal or the like. In plan view, each of the lower arms 300 has a substantially V-shape having an apex on the front wheels 10 side. With the apex as a starting point, a substantially rectangular flat plate that projects inward in the vehicle width direction and a substantially rectangular flat plate that projects inward at a vehicle rear portion are integrally formed to form the lower arm 300. An end portion of a vehicle-front-side arm of each of the lower arms 300 and the action member 310 are rotatably fixed at the coupling portion CN1 to the sub-frame 200 by a bolt or the like. An end portion of a vehicle-rear-side arm of each of the lower arms 300 and the action member 310 (described later) are rotatably fixed to the sub-frame 200 by a bolt or the like. Each of the lower arms 300 may be fixed to the sub-frame 200 with a mounting bracket (not illustrated) interposed therebetween.

Action Members 310

Each of the action members 310 is provided with a fixation portion FT (fixation portion FTA or FTB), which is hatched in FIG. 2. The fixation portion FT is disposed at a vehicle-rear-side end and is fitted to the sub-frame 200. The action member 310 extends from the fixation portion FT toward the vehicle-front-portion inside. Each of the action members 310 is made of a metal or the like and has a substantially rectangular closed cross-sectional shape. A vehicle-front-side end surface of each of the action members 310 is disposed in contact with a vehicle-rear-side surface of the sub-cross member 210. The fixation portion FT is fitted to the recess CO of the sub-frame 200. The fixation portion FT is provided with, at a portion from the vehicle front side to a vehicle-rear-side end of the fixation portion FX, a recess-shaped step that extends from the vehicle lower surface of the action member 310 toward the vehicle upper side.

As illustrated in FIG. 3, the action member 310 is fixed at the fixation portion FX and the coupling portion CN2 in a state of being fitted to the sub-frame 200 by a bolt or the like. At the coupling portion CN2, the action member 310 is disposed on the upper surface side of the sub-frame 200. The lower arm 300 is placed on the vehicle upper side of the action member 310, and the action member 310 and the lower arm 300 are fastened together to the sub-frame 200. Peripheral portions of the fixation portion FX and the coupling portion CN2 of the action member 310 are each formed to be strong by, for example, having a thick plate thickness. The fixation portion FX of the action member 310 is disposed at a location where a distance from the fixation portion FX to the coupling portion CN2 is shorter than a distance from a vehicle-front-side end of the action member 310 to the fixation portion FX.

Actions and Effects

The vehicle-body front structure S according to the present embodiment configured as described above may cause a collision object to collide with vehicle-front both sides in a full-wrap collision and causes a collision object to collide with either one of sides in the vehicle width direction in an offset collision and a small-overwrap collision. Hereinafter, with reference to FIG. 4 and FIG. 5A to 5C, an action when a collision from the front side of the vehicle V occurs will be described.

Figure 4:
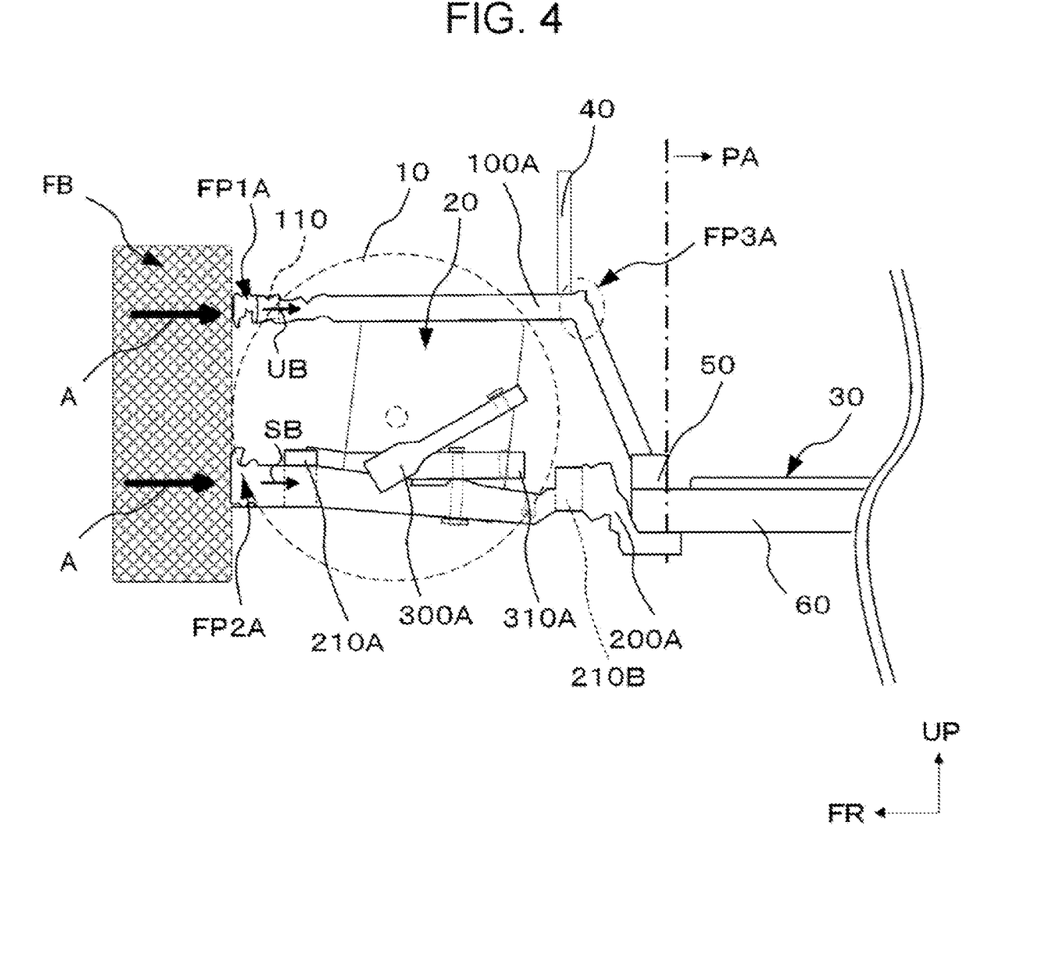
FIG. 4 is a side view in which a deformation of the vehicle-body front structure at the time of a frontal collision of the vehicle-body front structure according to the disclosure is viewed from the right side.
Figure 5A:
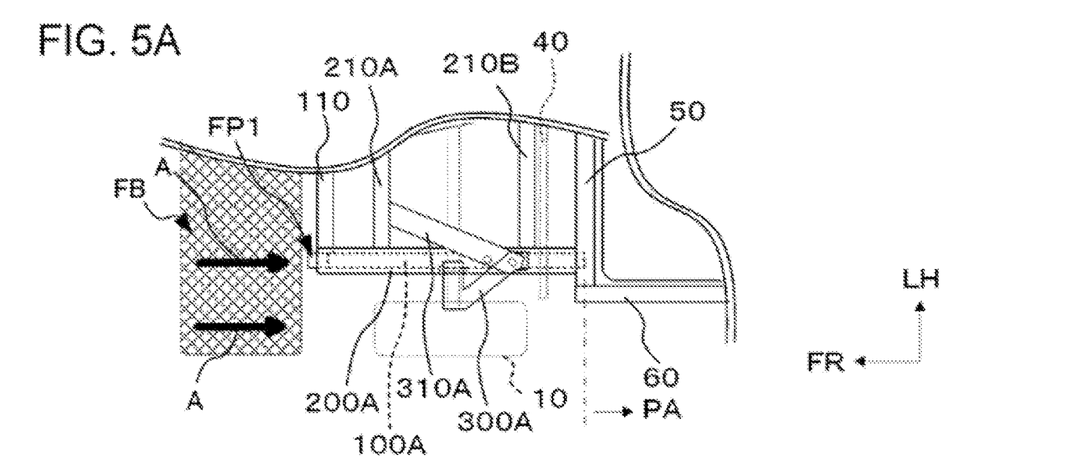
FIG. 5A, FIG. 5B, and FIG. 5C are each a plan view in which a deformation of a vehicle-body front structure at the time of a frontal collision of the vehicle-body front structure according to an embodiment of the disclosure is viewed from above in a state in which front side frames and a power unit are detached, FIG. 5A illustrating a state before the frontal collision, FIG. 5B and FIG. 5C illustrating the deformation at the time of the frontal collision in chronological order.

When a frontal collision of a collision object FB with the vehicle V occurs, as illustrated in FIG. 4 and FIG. 5A to 5C, collision energy is generated in a direction indicated by the arrows A. Before the collision, as illustrated in FIG. 5A, a space is kept between the cross member 110 and the sub-cross member 210A.

As illustrated in FIG. 4, the collision energy indicated by the arrow UB is transmitted to the front side frame 100A in a direction from the vehicle front side toward the vehicle rear side. This collision energy collapses the fragile portion FP1A located at a vehicle-front end portion of the front side frame 100A and causes a deformation of the front side frame 100A to proceed. Due to the bent portion FP3A being pressed toward the vehicle rear side, the front side frame 100A is deformed toward the vehicle rear side while being bent with a fulcrum at a portion joined to the torque box 50. The collision energy is absorbed by the deformation of the front side frame 100A. The collision energy is transmitted to the torque box 50 joined at a vehicle-rear-side end of the front side frame 100A. The collision energy is then dispersed to the side sills 60 through the torque box 50.

Collision energy indicated by the arrow SB is transmitted to the sub-frame 200 in a direction from the vehicle front side toward the vehicle rear side. Since the fragile portion FP2A of the vehicle-front end portion of the sub-frame 200 is provided in a recessed shape on the upper surface side of the sub-frame 200, the vehicle-front end portion of the sub-frame 200 is deformed toward the vehicle upper side with a fulcrum at the fragile portion FP2A. Since the action member 310 is fixed to the sub-frame 200 and supports a portion between the sub-frame 200 and the sub-cross member 210A, the collapse and deformation of the sub-frame 200 proceed further on the vehicle front side of the sub-cross member 210A. The collision energy is then absorbed by the deformation of the sub-frame 200.

Figure 5B:
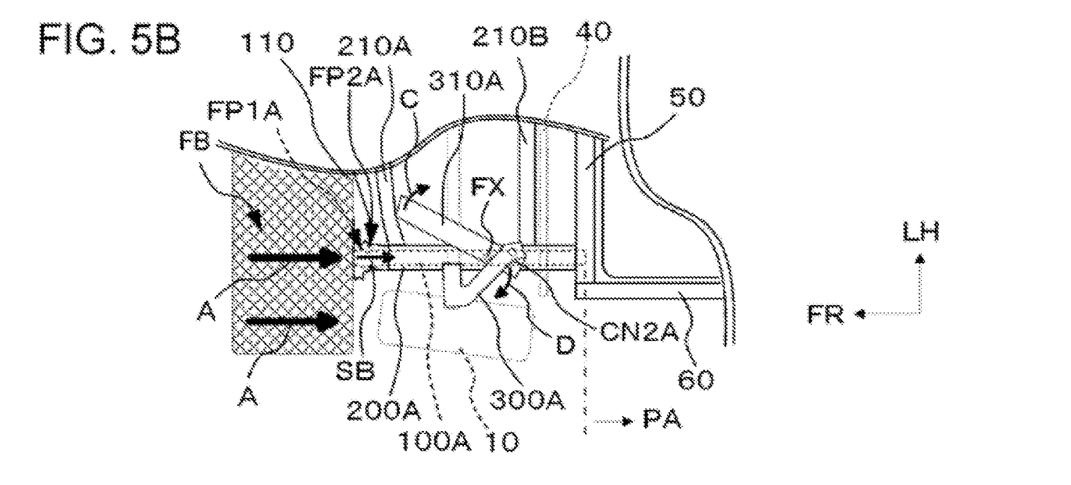

When the collision energy increases, as illustrated in FIG. 5B, the collision energy is transmitted in the direction indicated by the arrow SB and causes the collapse and deformation of the sub-frame 200 to proceed. The sub-cross member 210A joined to the sub-frame 200 is pressed at an end thereof joined to the sub-frame toward the vehicle rear side and causes the deformation to proceed, and the action member 310 starts rotating in a direction indicated by the arrow C with the fixation portion FX as fulcrum. At this time, due to the fixation portion FX being disposed at a location where a distance from the fixation portion FX to the coupling portion CN2 is shorter than a distance from the vehicle-front-side end of the action member 310 to the fixation portion FX, the principle of leverage acts on the action member 310. Here, the vehicle-front-side end of the action member 310 serves as a point of effort in the principle of leverage, the fixation portion FX serves as a fulcrum in the principle of leverage, and the coupling portion CN2 serves as a point of action in the principle of leverage. Then, at the coupling portion CN2A, the action member 310 rotates in the direction indicated by the arrow D to cause the leverage to act, and the bolt by which the action member 310 and the lower arm 300 are fastened together is simply sheared off. The coupling portion on the vehicle rear side of the lower arm 300 and the action member 310 then comes off from the sub-frame 200.

Figure 5C:
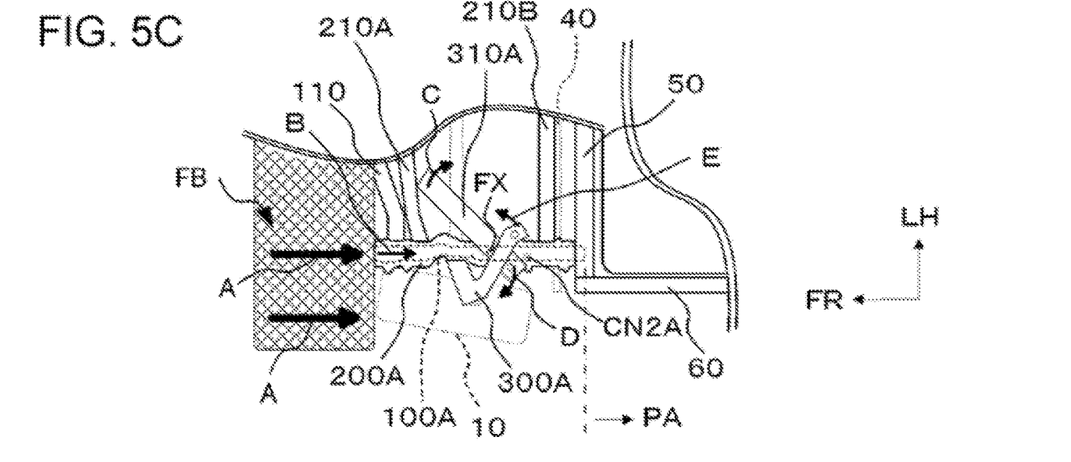

When the collision energy increases, as illustrated in FIG. 5C, the vehicle front side of the sub-frame 200 is further pressed in the direction indicated by the arrow B, and the collapse of the sub-frame 200 and the deformation of the sub-cross member 210A further proceed. When the action member 310 supporting a portion between the sub-frame 200 and the sub-cross member 210A rotates in the direction indicated by the arrow C, the collapse of the sub-frame 200 for which supporting is lost further proceeds consequently. The coupling portion on the vehicle rear side of the lower arm 300 comes off and rotates in the direction indicated by the arrow E, thereby increasing a range in which the sub-frame 200 is collapsed and deformed toward the vehicle rear side. Then, the collapse of the sub-frame 200 and the deformation of the sub-cross member 210A further proceeds. The collision energy transmitted to the sub-frame 200 is dispersed to the sub-cross member 210B, the torque box 50, and the side sills 60.

As described above, with the framework formed by the front side frames 100 on both sides in the vehicle width direction, the cross member 110, and the torque box 50 that are joined together and the parallel-cross-shaped strong framework formed by the sub-frames 200, the sub-cross member 210A, the torque box 50, and the side sills 60 that are joined together, collision energy is dispersed to the parallel-cross-shaped framework and absorbed by a deformation of the parallel-cross-shaped framework.

When an input of the collision energy ends, absorption of the collision energy by the deformation of the vehicle-body front structure S ends.

As described above, the vehicle-body front structure S according to the present embodiment is the vehicle-body front structure S that includes the pair of front side frames 100 provided at a front portion of the vehicle V and extending in the vehicle front-rear direction; and the pair of sub-frames 200 provided on the lower side of the front side frames 100 and extending in the vehicle front-rear direction. The vehicle-body front structure S includes the lower arms 300 constituting a suspension that bridges between the front wheels 10, the lower arms 300 being each coupled at the coupling portions CN1 and CN2 provided in the vehicle front-rear direction to a corresponding one of the sub-frames 200; and the action members 310 each provided with the fixation portion FT on the vehicle rear side, the fixation portion FT being fitted to a corresponding one of the sub-frames 200, the action member 310 extending from the fixation portion FT toward the inside of a vehicle front portion. Each of the sub-frames 200 includes the coupling portion CN1 as the first coupling portion that rotatably fixes a corresponding one of the lower arms 300 and the coupling portion CN2 as the second coupling portion. Each of the sub-frames 200 is provided with the fixation portion FX as an action-member fixation portion that is provided between the coupling portion CN1 and the coupling portion CN2 and rotatably fixes a corresponding one of the action members 310, and the recess CO fitted to the action member 310. With the recess CO of the sub-frame 200 and the fixation portion FT of the action member 310 being fitted together, the action member 310 is fixed at the fixation portion FX and the coupling portion CN2 to the sub-frame 200 by a bolt or the like and fixed at the coupling portion CN2 to the sub-frame 200 by being fastened together with the lower arm 300 by a bolt of the like.

When a frontal collision of the vehicle V occurs, collapse of the sub-frames 200 proceeds. Since the action member 310 is fixed to the sub-frame 200 and supports a portion between the sub-frame 200 and the sub-cross member 210A, collision energy collapses and deforms the sub-frame 200 on the vehicle front side of the sub-cross member 210A. When the collapse and deformation of the sub-frame 200 further proceed, the sub-cross member 210A is pressed toward the vehicle rear side, and the action member 310 starts rotating in the direction indicated by the arrow C with the fixation portion FX as a fulcrum. Then, the bolt by which the action member 310 and the lower arm 300 are fastened together at the coupling portion CN2 is sheared. The coupling portion CN2 on the vehicle rear side of the lower arm 300 and the action member 310 comes off and starts rotating, thereby increasing the range in which the sub-frame 200 is collapsed and deformed toward the vehicle rear side.

In other words, with the vehicle-body front structure S, when a frontal collision of the vehicle V occurs, the vehicle-front-side end of the action member 310 is pressed and rotates toward the inside in the vehicle width direction, thereby causing the coupling portion CN2 on the vehicle rear side of the lower arm 300 and the action member 310 to come off and increasing the range of the collapse and deformation of the sub-frame 200. Then, collision energy may be dispersed to the parallel-cross-shaped strong framework formed by the sub-frames 200, the sub-cross members 210A and 210B, the torque box 50, and the side sills 60 that are joined together, and the collision energy may be absorbed by the deformation of the parallel-cross-shaped framework. The vehicle-body front structure S thus may absorb the collision energy in the inside of the vehicle front chamber FA.

Therefore, deformations of the cabin CA and the battery pack 30 present in the protection region PA may be reduced.

In the vehicle-body front structure S according to the present embodiment, the fixation portion FX as the action-member fixation portion is disposed, in the action member 310, at a location where a distance from the fixation portion FX to the coupling portion CN2 as the second coupling portion is shorter than a distance from the vehicle-front-side end of the action member 310 to the fixation portion FX.

When a frontal collision of the vehicle V occurs, collapse of the sub-frames 200 proceeds. Then, as a result of the sub-cross member 210A being pressed toward the vehicle rear side, the action member 310 starts rotating in the direction indicated by the arrow C with the fixation portion FX as a fulcrum. At the coupling portion CN2 serving as the point of action in the principle of leverage with the vehicle-front-side end of the action member 310 serving as the point of effort in the principle of leverage and the fixation portion FX serving as the fulcrum in the principle of leverage, the action member 310 simply shears the bolt by which the action member 310 and the lower arm 300 are fastened together.

In other words, when a frontal collision of the vehicle V occurs, the action member 310 simply shears the bolt at the coupling portion CN2 by using the principle of leverage to cause the lower arm 300 and the action member 310 to come off. By increasing the range of the collapse and deformation of the sub-frame 200, collision energy is dispersed to the parallel-cross-shaped strong framework, and the collision energy is absorbed by the deformation of the parallel-cross-shaped framework. The vehicle-body front structure S thus may absorb the collision energy in the inside of the vehicle front chamber FA.

Therefore, deformations of the cabin CA and the battery pack 30 present in the protection region PA may be reduced.

While a state in which the vehicle-front end of the action member 310 is in close contact with the sub-cross member 210A without being fixed to the sub-cross member 210A is presented as an example of an embodiment according to the disclosure, the vehicle-front end of the action member 310 may be weakly joined to the sub-cross member 210A by, for example, welding so as to be detachable from the sub-cross member 210A when a frontal collision occurs.

While an embodiment of the disclosure has been described above in detail with reference to the drawings, specific configurations are not limited to those in this embodiment and include design and others in a range not departing from the gist of the disclosure.

According to one or more embodiments of the disclosure, deformations of a cabin and a battery pack may be reduced in multiple frontal collision forms.

The invention claimed is:

1. A vehicle-body front structure comprising:
   front side frames in a pair provided at a front portion of a vehicle, the front side frames extending in a vehicle front-rear direction of the vehicle;
   sub-frames in a pair provided on a vehicle lower side of the front side frames, the sub-frames extending in the vehicle front-rear direction;
   lower arms constituting a suspension bridging between front wheels of the vehicle, the lower arms being coupled to the sub-frames respectively; and
   action members each provided with a fitting portion at a vehicle-rear-side end, the fitting portion being fitted to a corresponding one of the sub-frames, the action members each extending from the fitting portion toward an inside of a vehicle front portion of the vehicle,
   wherein each of the sub-frames is provided with a first coupling portion and a second coupling portion that rotatably fix a corresponding one of the lower arms; an action-member fixation portion that is provided between the first coupling portion and the second coupling portion and that rotatably fixes a corresponding one of the action members on a vehicle upper side of each of the sub-frames; and a recess that is fitted to the corresponding one of the action members, and wherein the fitting portion of each of the action members is fitted to the recess of the corresponding one of the sub-frames, and each of the action members is fixed at the action-member fixation portion and the second coupling portion to the corresponding one of the sub-frames and is fixed at the second coupling portion to the corresponding one of the sub-frames by being fastened together with the corresponding one of the lower arms.

2. The vehicle-body front structure according to claim 1, wherein, in each of the action members, the action-member fixation portion is disposed at a location where a distance from the action-member fixation portion to the second coupling portion is shorter than a distance from a vehicle-front-side end of the action member to the action-member fixation portion.

* * * * *